March 11, 1952     E. P. ROSSER     2,589,141
CALIPER GAUGE

Filed Nov. 17, 1949     2 SHEETS—SHEET 1

INVENTOR.
Eugene Preston Rosser

BY Kenyon & Kenyon
ATTORNEYS

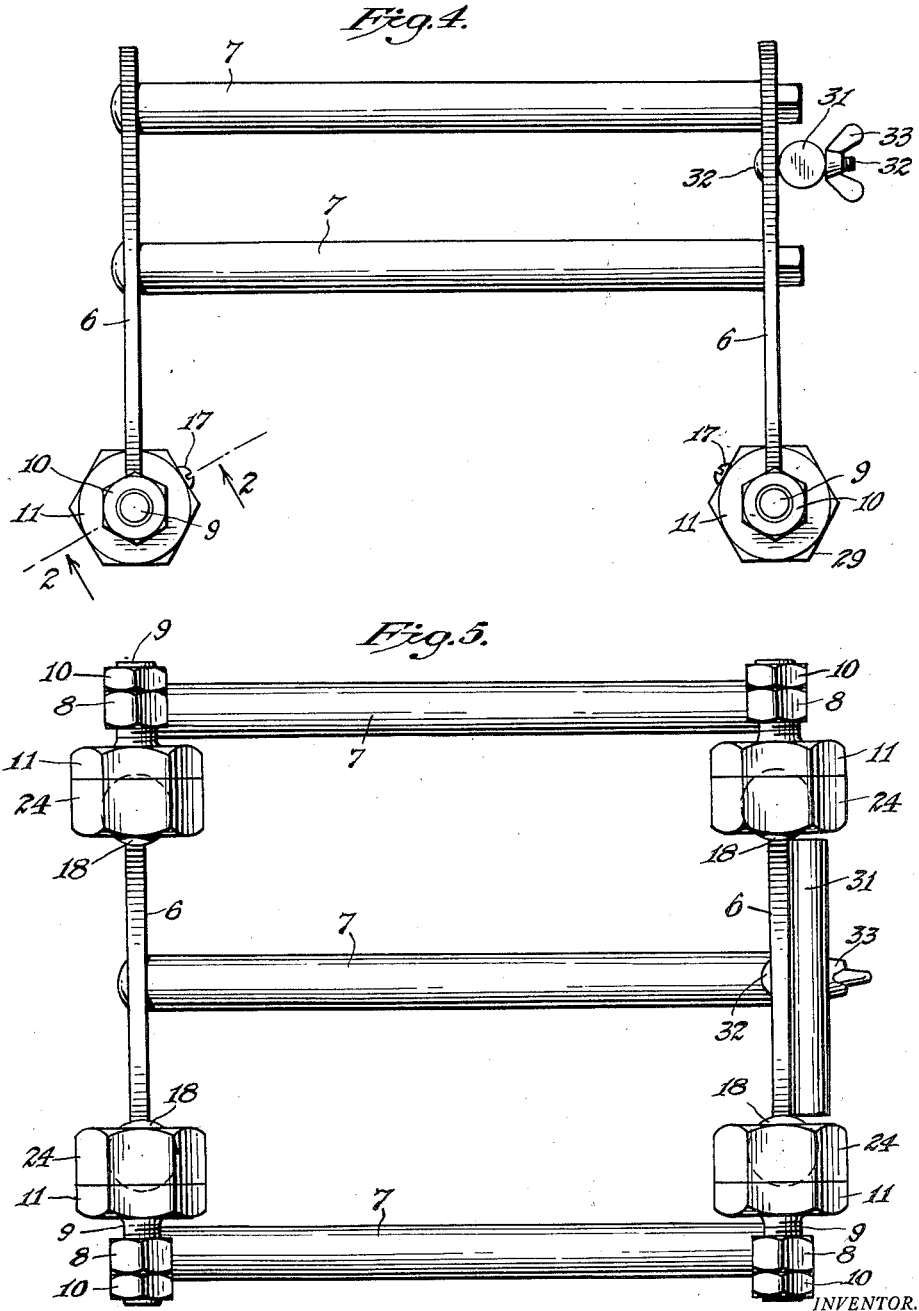

Patented Mar. 11, 1952

2,589,141

UNITED STATES PATENT OFFICE 2,589,141

CALIPER GAUGE

Eugene P. Rosser, Ardmore, Okla.

Application November 17, 1949, Serial No. 127,805

2 Claims. (Cl. 33—168)

This invention relates to a drill pipe outside caliper gauge which can gauge continuously during relative movement between the pipe and the gauge longitudinally respecting the pipe.

Drill pipe, such as is used to rotate the drill and carry the mud during oil well rotary drilling, is subjected to a reduction in its outside diameter as its service life lengthens. Excessive diameter reductions are frequently localized and can be detected with certainty only by periodically gauging the pipe throughout all of its length. This detection is considered desirable because a drill pipe section is apt to fracture when its outside diameter has reduced excessively, and it therefore should be found and replaced by a new or better section. Fracture occurs while the pipe is working in the well, and the string of pipe beneath the fracture can be retrieved only by expensive fishing operations.

Commercially available prior art caliper gauges must be pushed against the pipe and removed transversely from the same location before another location can be gauged. That is to say, the gauge cannot be run lengthwise along the pipe while continuously gauging. This disadvantage has made it heretofore relatively inconvenient to gauge the pipe throughout its length.

The object of this invention is to provide a practical outside caliper gauge permitting relative motion between the gauge and the pipe longitudinally respecting the latter while, at the same time, reliably working with adequate precision to detect with certainty all localized diameter reductions such as might cause an unexpected fracture when the pipe is working in the well. Attainment of this objective is complicated by the fact that the outside of working drill pipe is coated with drilling mud and debris. The pipe can be gauged during the drilling of a well only while it is out of the well or is being pulled from it, and it is therefore necessary that the gauging be done rapidly.

Referring to the accompanying drawings.

Figure 4 is a side view of Figure 1, the drill pipe not being indicated in this instance; and Figure 5 is a bottom view of Figure 4.

Figure 1:
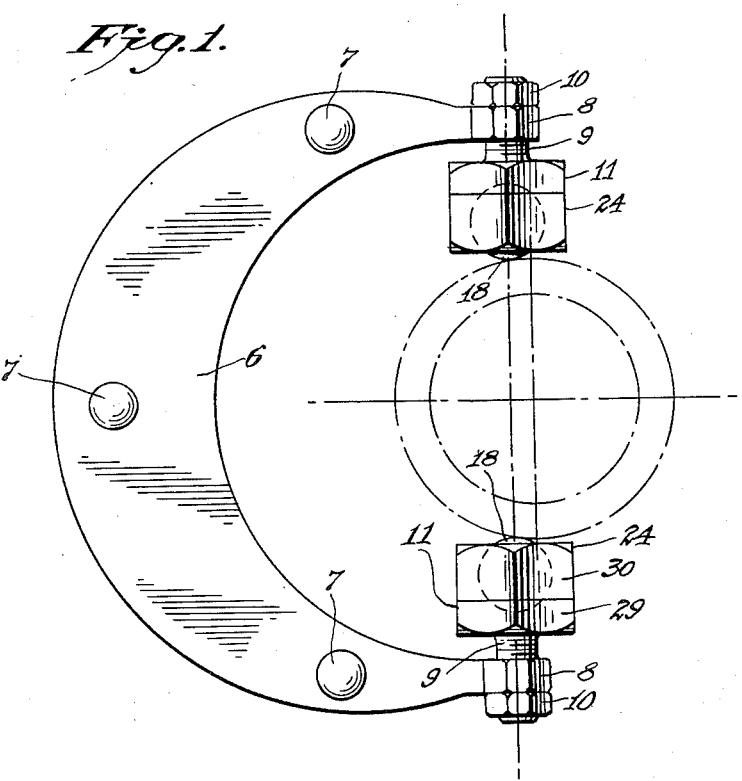
Figure 1 is an end view of the caliper gauge, suggestively shown at work on a piece of drill pipe indicated by broken lines.
Figure 2:
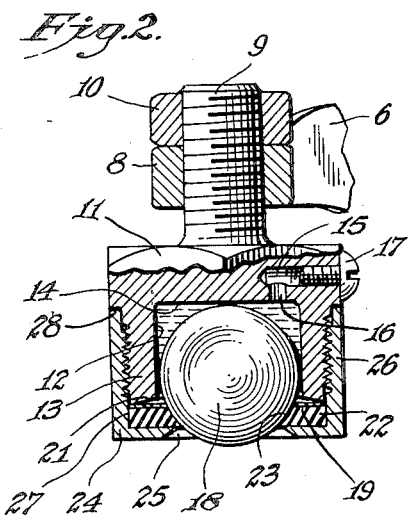
Figure 2 is a vertical section of one of the gauge contact assemblies shown in Figure 1.
Figure 3:
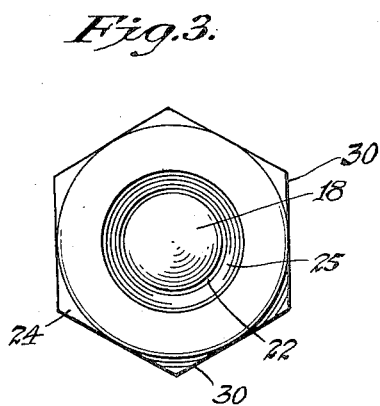
Figure 3 shows the working or face end of the above assembly.

In this preferred form, illustrated by the accompanying drawings, the new drill pipe outside caliper gauge is constructed as follows.

Two adequately rigid yokes 6 are interfastened in laterally spaced alignment by adequately rigid beams 7. The respective ends of each of the yokes 6 have mountings 8 in the form of hexagonal nuts welded to them. The nuts are arranged on the respective ends of each of the yokes 6 so that these mountings provide mutually aligned, oppositely spaced, internally threaded sets of holes for each of the yokes.

Screws 9 are oppositely threaded through the respective holes of each of the above mentioned sets of holes. These screws 9 have lock nuts 10 threaded on each of their respective outer ends. The inner end of each of the screws 9 rigidly carries a block 11. Each screw and block is shown as being an integral unit.

Each block 11 provides a cylindrical bore 12 concentric with the screw 9 and surrounded by an externally threaded cylindrical wall 13. In each instance the bore 12 points in the projecting direction of the inner end of the screw 9 and has a flat bottom 14 and a lubricant filling duct 15 extending through the block 11 from its outside to an outlet 16 adjacent to the periphery of the bottom 14 inside of the bore 12. This duct 15 has a closing means in the form of a screw 17 threaded into its outer end portion, the latter being internally threaded correspondingly to fit this screw 17.

Each of the blocks 11 has a hardened metal ball 18 fitting the inside of the wall 13 of the cylindrical bore 12. This ball contacts the bottom 14 and the side wall of the bore 12. A major portion of this ball 18 is encompassed by the wall 13 and the balance of the ball 18 projects therefrom oppositely away from the screw 9.

A thin flexible metal washer 19, such as brass shim stock, has its hole 20 snugly embracing the ball 18. This washer 19 is flatly positioned on the outer end edge 21 of the wall 13, and a sponge rubber washer 22 is superimposed flatly on this washer 19. The hole 23 of this sponge rubber washer also snugly embraces the projecting portion of the ball 18. The outer peripheries of both washers register with the outer periphery of the wall 13.

The ball 18 and the washer 19 and 22 are retained by a cap 24 having an outwardly flared hole 25 surrounding the projecting portion of the ball 18. This cap is further provided with a skirt 26 having a smooth cylindrical inner portion 27 snugly fitting the outer periphery of the washers 19 and 22, and also having an internally threaded body portion 27a threaded over the externally threaded wall 13. The outer end of the outside of this wall 13 is made smoothly cylindrical and so it snugly fits with the skirt's smooth portion 27. The outside of the wall 13 has a circular flange 28 against which the end edge of the skirt 26 butts. The end edge of the wall 13 is inwardly chamfered or relieved.

All of the circular parts and holes of the device, are concentric with each other. This statement does not apply to the lubricant filling duct.

Removal of the screw 17 permits the inside of the block to be filled with fluid lubricant which is retained by replacement of the screw 17. With the lubricant in the bore 12 the ball 18 is universally rotative in the assembly. The respective exposed portions of the block 11 and the cap 24 have separate individual wrench engaging surfaces 29 and 30 respectively.

As generally indicated by Figures 4 and 5, a setting gauge bar 31 is fastened to one of the yokes 6 by a screw 32 projecting from the yoke, with a wing nut 33 positioned outside to hold the bar 31 against the frame. The bar 31 has a suitable hold for the passage of the screw 32. This bar 31 has a length representing the minimum diameter which the drill pipe, for which this gauge is designed, may safely have without unduly risking fractures when working in the well.

The use of this device is as follows.

The screws 17 are removed and each of the blocks 11 is loaded with fluid lubricant. Then the screws 17 are replaced. The lock nuts 10 are loosened and the screws 9 screwed back and forth as required to make the opposed balls 18 firmly contact the opposite ends of the setting gauge bar 31, the latter having, of course, been removed from the frame for this purpose. When this adjustment is made, at each yoke, the lock nuts 10 are tightly screwed down and the bar 31 is returned to its storage position.

Now, using the device, the operator grasps a convenient one of the beams 7 and holds the two sets of gauge contacts, which are the balls 18, against the drill pipe while it is being pulled from the well, for example. The balls 18 freely rotate as the pipe pulls past the caliper gauge with the operator pushing the gauge towards the pipe. In this fashion the operator is able to continuously gauge each section of the pipe throughout its length and for the entire string of pipe as it is pulled from the well. Sometimes after the pipe sections are racked, the operator may find it more convenient to gauge them by walking along the sections with the gauge running on them like a small trolley.

In all instances, whenever the gauge slips over the pipe in any fashion the operator knows he has hit a location where the outside diameter has reduced excessively so that that section can no longer be used with assurance that it will not fracture. This piece may then be discarded and a new or better pipe section substituted.

Drilling mud or other contamination on the pipe does not interfere with the accuracy of this new device. In each instance the ball has sliding contact under material pressure only with the bottom 14 and the side wall of the bore 12. At these locations the ball is bathed continuously in lubricant. These sliding surfaces are kept clean because all mud or other contamination is continuously skinned from the ball by the action of the washers 19 and 22. These work effectively as seals regardless of the direction in which the ball rotates. Wear of the balls 18, by contacting the pipe, is retarded because the balls are continously lightly coated with a skin or film of the lubricant. This tends to adhere to the ball and to lubricate its exposed portion continuously.

When replacement of any of the parts is necessary, any of the balls may be easily removed by using wrenches to unscrew the cap 24 holding that particular ball in position. With the washers 21 and 22 of standard thicknesses, replacement of the cap 24, with its end tightly against the flange 28, readjusts all of the parts in exactly the manner originally intended. The relief or chamfer of the end edge of the wall 13 permits the washers to act like flexible diaphragms working with a spring action against the ball, in each instance.

I claim:

1. A caliper gauge containing, in combination, a yoke, a metal block secured to said yoke and having a cylindrical bore therein, said bore terminating within the block to form a seat at its bottom and defining at its open end an annular ledge, a hardened metal ball of diameter closely fitting the diameter of the bore seated within said bore and resting against the bottom thereof with a portion of its spherical surface extending outwardly through said annular ledge, an annular metallic washer seated on said ledge and having its inner periphery in contact with the surface of the ball, an annular rubber washer coaxial with said metallic washer and also having its inner periphery in contact with the surface of the ball, and an annular retaining cap screw-threadedly engaged with the block securing said block and ball and said metallic and rubber washers in assembled relation with a portion of the spherical surface of said ball exposed through an opening in said cap.

2. A caliper gauge as in claim 1, wherein the annular ledge defining the open end of the bore slopes inwardly, that is to say with its inner edge in a plane nearer to the bottom of the bore and its outer edge in a plane farther from said bottom, whereby the metallic washer is distorted when compressed against said ledge and thus held securely in contact with the surface of the ball.

EUGENE P. ROSSER.

REFERENCES CITED

The following references are of record in the file of this patent:

UNITED STATES PATENTS

| Number | Name | Date |
|--------|------|------|
| 563,720 | Rook | July 7, 1896 |
| 931,069 | Larrabee | Aug. 17, 1909 |
| 2,306,469 | Rupley | Dec. 29, 1942 |
| 2,398,983 | Wehner et al. | Apr. 23, 1946 |